United States Patent [19]

Kobayashi et al.

[11] Patent Number: 5,200,129
[45] Date of Patent: * Apr. 6, 1993

[54] PROCESS FOR CONTINUOUS PRODUCTION OF POLYOLEFIN MATERIAL

[75] Inventors: Seizo Kobayashi; Takashi Mizoe; Yoshimu Iwanami, all of Yokohama, Japan

[73] Assignee: Nippon Oil Co., Ltd., Tokyo, Japan

[*] Notice: The portion of the term of this patent subsequent to Feb. 25, 2009 has been disclaimed.

[21] Appl. No.: 687,501

[22] Filed: Apr. 19, 1991

[30] Foreign Application Priority Data

Apr. 20, 1990 [JP] Japan .................. 2-102928

[51] Int. Cl.⁵ .............................. B29C 43/26
[52] U.S. Cl. ...................... 264/119; 264/120; 264/126; 425/371; 425/373
[58] Field of Search .............. 264/119, 120, 126; 425/371, 373

[56] References Cited

U.S. PATENT DOCUMENTS

| | | | |
|---|---|---|---|
| 1,862,318 | 6/1932 | Ruby | 425/371 |
| 2,742,951 | 4/1956 | Marc | 425/371 |
| 3,942,929 | 3/1976 | De Mets | 425/371 |
| 4,563,320 | 1/1986 | Morgan | 264/151 |
| 4,820,466 | 4/1989 | Zachariades | 264/119 |
| 4,996,011 | 2/1991 | Sano et al. | 264/28 |
| 5,002,714 | 3/1991 | Sano et al. | 264/119 |
| 5,026,511 | 6/1991 | Sano et al. | 264/28 |
| 5,039,462 | 8/1991 | Chilko et al. | 264/23 |

FOREIGN PATENT DOCUMENTS

| | | |
|---|---|---|
| 0226434 | 6/1987 | European Pat. Off. . |
| 0253513 | 1/1988 | European Pat. Off. . |
| 0374785 | 6/1990 | European Pat. Off. . |
| 0410384 | 1/1991 | European Pat. Off. . |
| 2853285 | 6/1979 | Fed. Rep. of Germany . |
| 2443325 | 7/1980 | France . |
| 63-41512 | 2/1988 | Japan . |

*Primary Examiner*—Mary Lynn Theisen
*Attorney, Agent, or Firm*—Oblon, Spivak, McClelland, Maier & Neustadt

[57] ABSTRACT

According to the present invention, a polyolefin sheet, film or fiber having a high strength and a high modulus can be continuously produced by:

feeding an ultra-high-molecular-weight polyolefin powder between a pair of upper and lower endless belts opposed to each other, conveying the polyolefin powder between the endless belts under compression to compression-mold the polyolefin powder at a temperature lower than the melting point of the polyolefin powder, the compression being continuously and smoothly effected, via the endless belts, by a pressing means comprising two sets of rollers which are arranged at the back sides of the endless belts so that each one roller of the two roller sets faces each other and each of which rollers is rotatably supported at the shaft ends by a frame, and then rolling and stretching the resultant compression-molded polyolefin in this order.

15 Claims, 1 Drawing Sheet

PROCESS FOR CONTINUOUS PRODUCTION OF POLYOLEFIN MATERIAL

BACKGROUND OF THE INVENTION

1. Field of the Invention

The present invention relates to a process for continuously producing a polyolefin material having a high strength and a high modulus by continuously compression-molding a polyolefin powder at a temperature lower than the melting point and then rolling and stretching the resultant compression-molded polyolefin.

2. Description of the Related Art

So-called ultra-high-molecular-weight polyolefins having a significantly high molecular weight have excellent impact resistance, excellent abrasion resistance, self-lubricating property, etc. and are an engineering plastic having a number of features. They can be made into a molded product of high strength and high modulus if they can be oriented to a high degree by an easy method. Therefore, development of such an easy method is highly expected.

The present inventors previously provided, in Japanese Patent Application Kokai (Laid-Open) Nos. 41512/1988 and 66207/1988 [corresponding to EP 253513 A1 (1988)], a process for producing a polyolefin material of high strength and high modulus by batchwise compression-molding an ultra-high-molecular-weight polyolefin powder at a temperature lower than the melting point of the powder without melting it or dissolving it in any solvent, and then rolling and stretching the resultant compression-molded polyolefin.

In order to improve the productivity of the above batchwise process, the present inventors further proposed a process comprising feeding a polyolefin powder between a pair of upper and lower endless belts facing each other, conveying the polyolefin powder between the endless belts under compression to continuously compression-mold the polyolefin powder, the compression being effected by a pressing means comprising pressing platens and corresponding sets of rollers, the pressing platens being arranged within the endless belts, said sets of rollers being arranged between the pressing platens and the endless belts, the rollers of each set being connected in a series and each arranged rotatably, and then rolling and stretching the resultant compression-molded polyolefin [corresponding to EP 0374785 A1 (1990)].

In order to carry out the above process more efficiently, the present inventors and the co-worker provided a process comprising processing a polyethylene powder by mixing it with a liquid organic compound having a boiling point not lower than the melting point of the polyethylene [EP 0396 061 A1 (1990)] and a process comprising concurrently processing an ultra-high-molecular-weight polyethylene powder and an olefinic polymer having a molecular weight lower than that of the polyethylene powder [corresponding to EP 0410384 A2 (1991)].

The "pressing means comprising pressing platens and corresponding sets of rollers, the pressing platens being arranged within the endless belts, said sets of rollers being arranged between the pressing platens and the endless belts, the rollers of each set being connected in a series and each arranged rotatably" employed in the continuous and efficient process provided by the present inventors, substantially discloses a process wherein each roller of each roller set is fixed at the two ends by chains and these chains are meshed with sprockets arranged at the both ends of the associated platen to allow the set of rollers to travel at an appropriate speed corresponding to the running speed of the associated endless belt. It is described in the disclosure that each set of rollers may be arranged fixedly between the endless belt and the associated pressing platen but, in this case, a frictional force is generated by slip between the rollers and the endless belts and between the rollers and the pressing platens, giving rise to the durability problems of the apparatus.

SUMMARY OF THE INVENTION

The present inventors made study on simplification of the pressing means employed in the conventional process and materialization of a simplified pressing means, and repeated the trial manufacture of an experimental apparatus and the test operation of the trially manufactured apparatus. As a result, the present inventors found that a high-strength and high-modulus polyolefin material can be continuously produced by compression-molding a material polyolefin powder at a temperature lower than the melting point of the powder using a particular pressing means and then rolling and stretching the resultant compression-molded polyolefin.

The present invention resides in a process for continuously producing a high-strength and high-modulus polyolefin material, which comprises:

feeding a polyolefin powder between a pair of upper and lower endless belts opposed to each other, conveying the polyolefin powder between the endless belts under compression to compression-mold the polyolefin powder at a temperature lower than the melting point of the polyolefin powder, the compression being effected, via the endless belts, by a pressing means comprising two sets of rollers which are arranged at the back sides of the endless belts so that each one roller of the two sets faces each other and each of which rollers is rotatably supported at the shaft ends by a frame, and then rolling and stretching the resultant compression-molded polyolefin in this order.

DESCRIPTION OF THE PREFERRED EMBODIMENTS

Figure 1:
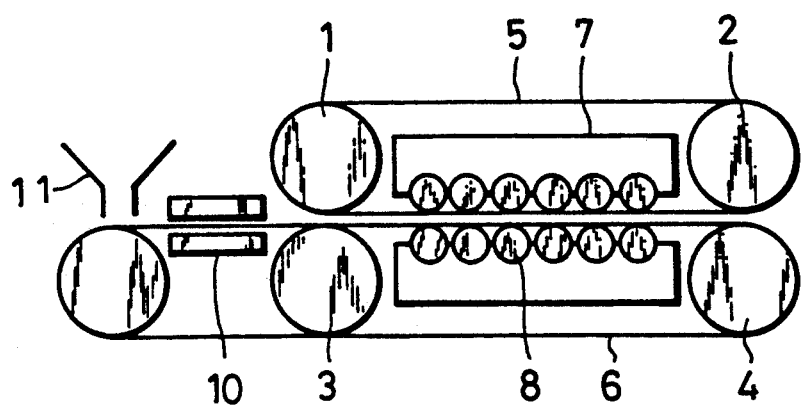
FIG. 1 is a schematic illustration showing the outline of an apparatus used in the practice of the production process of the present invention.

The process of the present invention enables compression molding of a polyolefin at a lower pressure than in the conventional processes, by the use of a particular pressing means, without employing troublesome operations such as melting of the polyolefin or dissolution of the polyolefin in a solvent, in the polyolefin molding steps including polymerization, compression molding, rolling and stretching. As a result, the present process can produce a high-strength and high-modulus polyolefin material of excellent properties at a lower pressure and easily.

Examples of the polyolefin usable in the process of the present invention for the continuous production of a high-strength and high-modulus polyolefin material include homopolymers of α-olefins having 2-8, preferably 2-6 carbon atoms, for example, low-density polyethylene, medium-density polyethylene, high-density polyethylene, polypropylene, polybutene-1 and poly-4-methylpentene-1; and copolymers of α-olefins of different carbon atoms, for example, copolymers of ethylene and α-olefins having 3-12, preferably 3-8 carbon atoms and copolymers of propylene and α-olefins having 4-12, preferably 4-8 carbon atoms.

The terms such as polyethylene, polypropylene and the like, used in the present invention refer not only to homopolymers of ethylene, propylene and the like but also to copolymers of ethylene and small amounts of α-olefins of 3-12 carbon atoms (the content of α-olefins is not particularly limited but is generally 10 mole % or less, preferably 0.01-5 mole %), copolymers of propylene and small amounts of α-olefins of 4-12 carbon atoms (the content of α-olefins is not particularly limited but is generally 10 mole % or less, preferably 0.01-5 mole %), etc.

Among these polyolefins usable in the process of the present invention, those having a higher molecular weight are generally preferred because they can provide materials having higher strength and modulus.

In the case of polyethylene, for example, desired are those having a viscosity-average molecular weight of 500,000-12,000,000, preferably 900,000-9,000,000, more preferably 1,200,000-6,000,000, or when expressed in terms of intrinsic viscosity at 135° C. in decalin, those having an intrinsic viscosity of 5-50 dl/g, preferably 8-40 dl/g, most preferably 10-30 dl/g, in other words, so-called ultra-high-molecular-weight polyethylenes. In the case of polypropylene, those having a molecular weight of at least 1,000,000 are preferred.

No particular limitation is imposed on the shape of these polyolefins but granular or powdery polyolefins are suitable in general.

In the case of polyethylene, for example, desired are those having a particle size not greater than 2,000 μm, preferably not greater than 1,000 μm. A narrower particle size distribution can afford a better sheet.

DETAILED DESCRIPTION OF THE INVENTION

In the process of the present invention for the continuous production of a high-strength and high-modulus polyolefin material, a polyolefin powder is firstly compression-molded continuously to form a compression-molded sheet.

Description is made on the apparatus used for the formation of the compression-molded sheet, with reference to FIG. 1 which illustrates a specific example of the apparatus.

The apparatus is basically constructed of two key components, i.e. a pair of upper and lower endless belts 5,6 opposed to each other, to which a pulling force is applied by rolls 1-4, and a pressing means. The pressing means is to compress the polyolefin powder fed, via the endless belts, and comprises two sets (upper and lower) of rollers 8 (each roller is rotatable and is supported by bearings, etc. and a frame 7 at the shaft ends).

The number of the rollers 8 is appropriately at least three per each endless belt. The outside diameter of the rolls 1-4 has not particular limitation as long as the endless belts are driven smoothly.

As the endless belts, it is suitable to use those having a thickness of about 0.1-1.5 mm and a surface polished in a mirror-finished state on the side which is brought into contact with a polyolefin powder to be compression-molded.

If the endless belts have an unduly small thickness, the endless belts are prone to deformation and damage (e.g. breakage). Meanwhile, an excessively large thickness leads to the need for enlarging the outside diameter of the rolls 1-4 which pull the endless belts, which makes the apparatus large as a whole. Such an unduly small or large thickness is, therefore, not preferred.

Stainless steel can be mentioned as a representative material for the endless belts. Other suitable metal belts can also be used either as they are or by coating them with a resin such as fluorine-contained resin or the like.

In the present invention, the pressing means comprises two opposing sets (upper and lower) of rollers which are rotatably arranged at the sides of the endless belts opposite to the working sides and which are supported by bearings, etc. and frames at the shaft ends. Preferably, each pair of rollers 8 (one of the upper set and the other of the lower set) are arranged so as to face each other in a vertical plane intersecting the travelling direction of the endless belts.

When the two rollers in pair are not arranged as above, the belts undergo bending stress repeatedly, which tends to shorten the durability of the belts. In the conventional rollers driven by chains, the upper and lower two rollers in pair are not always arranged so as to face with each other in a vertical plane; their arrangement deviating from precise facing not only gives an adverse effect on the durability of the belts but also imparts delicately differing pressures to the polyolefin sheet, giving products varying in packing density.

Suitably, the rollers in each set are arranged in a large number in such a way that they are close to each other but without mutual contact. As the outside diameter of the rollers, a smaller diameter, specifically, about 10-50 mm is preferred.

If the outside diameter of the rollers is unduly small, excessively large localized linear pressures are applied to the endless belts so that the small-diameter rollers tend to form depressions in the endless belts and the endless belts are susceptible to deformation.

Meanwhile, if the rollers have an unduly large outside diameter, it is necessary to make longer the pressing section functioning as a pressing platen for endless belts. If the pressing section is short, the pressing section cannot contain rollers as many as needed to provide a good compression-molded sheet.

Figure 3:
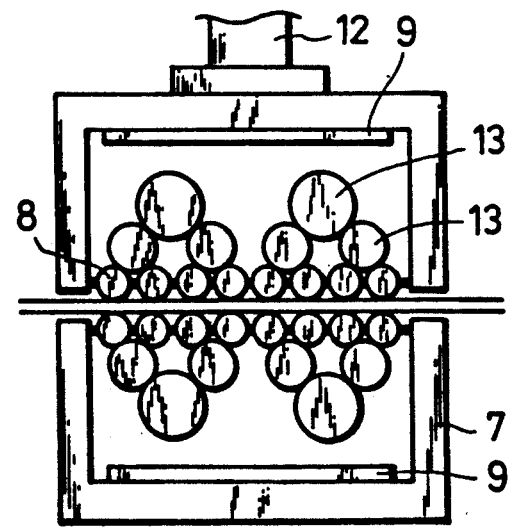
FIG. 3 is a schematic illustration showing the pressing section of an apparatus comprising the apparatus of FIG. 1 and back-up rolls annexed thereto.

When the rollers have a small diameter, it is preferable to annex back-up rolls 13 as seen in FIG. 3, to each set of rollers, in order to prevent the rollers from being deflected.

The appropriate number of the rollers, in other words, the appropriate total length of the rollers in the travelling direction of the endless belts is generally about 100-5,000 mm, preferably about 500-2,000 mm.

When an ultra-high-molecular weight polyolefin powder to be compression-molded is passed under compression between the upper and lower belts pressed by the upper and lower rollers 8, the powder receives a linear pressure. In this case, the powder receives an average pressure of generally 0.1-100 kgf/cm$^2$, preferably 0.5-50 kgf/cm$^2$, more preferably 1-20 kgf/cm$^2$.

The rollers 8 have a primary role of compressing a polyolefin powder via the endless belts but may also be used as a heating means for the powder to be compression-molded.

In the process of the present invention, practice of the compression-molding step at a temperature lower than the melting point of the polyolefin powder as a material to be compressed is very important for obtaining a high-strength and high-modulus polyolefin material through the subsequent rolling and stretching steps.

To obtain a good compression-molded sheet, it is desirable that the temperature employed in compression molding be not only below the melting point but also fall within a particular range.

The temperature can be, for example, generally at least 50° C., preferably at least 90° C. for polyethylene polymers and generally at least 90° C., preferably at least 130° C. for polypropylene polymers, but must be lower than the respective melting points.

Figure 2:
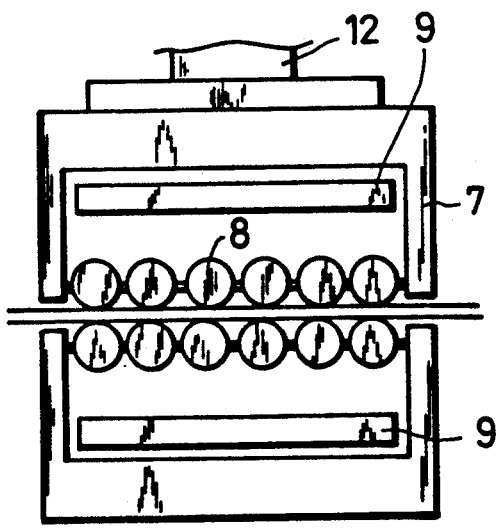
FIG. 2 is a schematic illustration showing the pressing section of the apparatus of FIG. 1.

As the heating means for the polyolefin powder to be compression-molded, it is most suitable to directly heat the endless belts in the pressing section. However, it is convenient in practicing the present invention to provide heating means 9 in the vicinity of the rollers as shown in FIG. 2, or to provide preheaters 10 in the vicinity of the endless belts at the place right before the endless belts advance between the rollers.

It is of course possible to use the heating means 9 and the preheaters 10 in combination. Such combination use is appropriate in some cases.

In practicing the process of the present invention for the continuous production of a high-strength and high-modulus polyolefin material, using the typical apparatus shown herein, a polyolefin powder which has been fed and stored in a hopper 11 is fed downwardly through a hopper outlet, which has a desired cross-sectional shape, onto a lower endless belt which is running.

The running speed of the endless belt is determined by the amount of powder fed, the total length of the pressing section constituted by rollers, compression conditions, etc., but an appropriate running speed is generally about 10-5,000 mm/min, preferably about 100-3,000 mm/min, more preferably about 500-2,000 mm/min.

The polyolefin powder fed onto the endless belt is optionally preheated to a predetermined temperature by means of preheaters 10 and is then brought to a squeezing section constructed of upper and lower endless belts 5,6, followed by further travelling to a pressing section where two sets of rollers are arranged.

In the pressing section, pressures from hydraulic cylinders (not shown) are transmitted by hydraulic pistons 12 shown in FIG. 2 and 3, to frames supporting and fixing the rollers and further transmitted, by way of the rollers and the endless belts to the polyolefin powder to be compressed.

At the same time, heats from the heating means 9 are also transmitted to the polyolefin powder by way of the rollers and the endless belts, whereby the polyolefin powder is maintained at a predetermined temperature.

The compression-molded sheet thus obtained is passed through the compression section comprising the rollers and are caused to leave the endless belts. In this manner, the continuous production of compression-molded sheet is performed.

In the present invention, a high-strength and high-modulus polyolefin material is obtained by rolling and then stretching the compression-molded sheet obtained as above.

As the rolling method, any known method can be used. It is, however, suitable to obtain aL rolled sheet or film by passing the compression-molded sheet between two reversely rotating rolls while maintaining the polyolefin in the state of solid phase without causing it to melt.

At this time, the deformation ratio of the material by the rolling operation can be selected from a wide range. Generally, it is preferable to set the deformation ratio at 1.2-20, preferably 1.5-20, more preferably 1.5-10 in terms of rolling efficiency (i.e., the length after rolling/the length before rolling).

As the rolling temperature, it is desirable to conduct the rolling operation at a temperature of at least 20° C. but lower than the melting point, preferably at a temperature of at least 90° C. but lower than the melting point.

The above rolling operation may be effected in multiple steps, namely, in two or more steps.

The stretching, which is conducted following the rolling, can be performed in various ways. Depending on differences in heating means, there are hot-air stretching, cylinder stretching, roll stretching, hot-plate stretching, etc. Whichever method is employed, stretching is performed by driving a pair of nip rolls or crowbar rolls at different speeds.

The stretching temperature is maintained at temperatures lower than the melting point of the polyolefin, generally at 20°-160° C., preferably 50°-150° C., more preferably 90°-145° C., particularly preferably 90°-140° C.

The stretching can be conducted not only in a single step but also in multiple steps. When it is conducted in multiple steps, it is preferable to conduct the stretching at a higher temperature in the second step than in the first step.

The stretching speed can be selected suitably. It is in the range of generally 0.01-500 m/min, preferably 0.1-200 m/min, more preferably 1-200 m/min. A higher speed is preferred from the standpoint of economy and a speed of 5 m/min or more is particularly preferred.

It is desirable to employ a draw ratio as high as possible, because higher strength and higher modulus can be attained as the draw ratio becomes higher.

In the production process of the present invention, the draw ratio is, for example, at least 20-fold when an ultra-high-molecular-weight polyethylene is used and generally at least 60-fold.

It is possible to attain a total draw ratio (a total draw ratio achieved by both rolling and stretching) of 80-fold to 200-fold. Therefore, stretching at an extremely high draw ratio is feasible.

As described above, a high-strength and high-modulus polyolefin material is produced.

According to the process of the present invention, polyolefin materials of very high strength and high modulus can be obtained as typified by the provision of a polyethylene material having a tensile modulus of at least 120 GPa and a tensile strength of at least 2 GPa when a polyethylene is used as a polyolefin by way of Example.

The present invention has made it possible for the first time to provide a process for continuously and easily providing a high-strength and high-modulus polyolefin sheet, film, tape or fiber from an ultra-high-molecular-weight polyolefin powder at a low pressure, using an apparatus which is smooth in driving and low in power requirement and which has good durability and reliability.

EXAMPLE

Specification of apparatus used:
1. Rolls—diameter 500 mm. surface length: 300 mm
2. Steel belts—thickness: 0.8 mm, width: 200 mm
3. Rollers—total number: 12, diameter: 50 mm, surface length: 250 mm, length of pressing section: 630 mm
4. Hydraulic cylinders—diameter: 125 mm Using a compression-molding apparatus of the above specification, a powder of an ultra-high-molecular-weight polyethylene having a viscosity-average molecular weight of about 3,000,000 was heated to 130° C. and pressed at an average pressure of about 14 kgf/cm$^2$, whereby a compression-molded sheet of 1.2 mm thick and 100 mm wide was continuously discharged from the apparatus at a speed of 1 m/min.

The sheet was then fed, at a speed of 1 m/min, between a pair of upper and lower rolls opposed to each other, maintained at a surface temperature of 140° C., driven in opposite direction at the same peripheral speed, having a diameter of 150 mm and a surface length of 300 mm and disposed at an interval of 50 μm, whereby the sheet was rolled into a film having a draw ratio of 6-fold.

The thus obtained rolled film was slit at a width of 5 mm and then stretched at a draw ratio of 20-fold by means of a hot-roll type stretching apparatus having a roll diameter of 250 mm while controlling the roll temperature at 135° C. and the peripheral speed at 1.5 m/min for the lower speed roll and at 30 m/min for the higher speed roll.

The resulting fiber had a tensile modulus of 130 GPa and a tensile strength of 3.1 GPa.

The modulus of elasticity and strength of the sample obtained above were measured at 23° C. by using "STROGRAPH R". The sample held between clamps had a length of 150 mm. It was stretched at a pulling speed of 100 mm/min. The modulus of elasticity was calculated using a stress at 0.1% strain. The cross-sectional area of the sample, which was required for the calculation, was determined by measuring the weight and length of the sample while assuming that the density of the polyethylene was 1 g/cm$^3$.

What is claimed is:

1. A process for continuously producing a high-strength and high-modulus polyolefin material, which comprises:
    feeding a polyolefin powder between a pair of upper and lower endless belts having inner and outer surfaces opposed to each other,
    conveying the polyolefin powder between the endless belts under compression to compression-mold the polyolefin powder at a temperature lower than the melting point of the polyolefin powder, the compression being effected, via the endless belts, by a pressing means comprising two opposing sets of a plurality of rollers, each set arranged at the outer surface of each endless belt so that each roller of one set faces a roller of the opposing set and each of which rollers is rotatably supported at the shaft ends by a frame, and then
    rolling and stretching the resultant compression-molded polyolefin.

2. A process according to claim 1, wherein each set of rollers arranged at the outer surface of each endless belt is constituted by three or more rollers.

3. A process according to claim 1, wherein each one pair of rollers of the two sets of rollers arranged at the outer surfaces of the endless belts is arranged so as to face each other in a vertical plane intersecting the travelling direction of the endless belts.

4. A process according to claim 1, wherein back-up rolls are annexed to each roller set arranged at the outer surface of each endless belt.

5. A process according to claim 1, wherein the polyolefin powder receives an average pressure of 0.1–100 kgf/cm$^2$ when it is passed between the two endless belts under compression by the two opposing roller sets.

6. A process according to claim 1, wherein a heating means is arranged in the vicinity of each roller set.

7. A process according to claim 1, wherein a preheater for heating each endless belt right before each endless belt advances between the two roller sets, is arranged in the vicinity of each endless belt.

8. A process according to claim 1, wherein a heating means is arranged in the vicinity of each roller set and further a preheater for heating each endless belt right before each endless belt advances between the two roller sets, is arranged in the vicinity of each endless belt.

9. A process according to claim 1, wherein the endless belt is driven at a speed of 0.01–500 m/min.

10. A process according to claim 1, wherein the polyolefin is rolled by rolls of different rotating direction while the polyolefin is being maintained in a solid state without being melted.

11. A process according to claim 1, wherein the rolling is effected at a draw ratio of 1.2–20 when expressed as the length after rolling/the length before rolling.

12. A process according to claim 1, wherein the rolling is effected at a temperature of 20° C. to lower than the melting point of the polyolefin.

13. A process according to claim 1, wherein the polyolefin powder is a powder of a homopolymer or copolymer of an α-olefin of 2–8 carbon atoms.

14. A process according to claim 1, wherein the polyolefin powder is a powder of a polyethylene having a viscosity-average molecular weight of 500,000–12,000,000.

15. A process according to claim 1, wherein the polyolefin is a powder of a polypropylene having a number-average molecular weight of 1,000,000 or more.

* * * * *